March 14, 1944. C. D. KNOWLTON 2,343,982
APPARATUS FOR SETTING PLASTIC EYELETS
Filed Dec. 8, 1941 2 Sheets-Sheet 1

INVENTOR
Cutler D. Knowlton
By his attorney

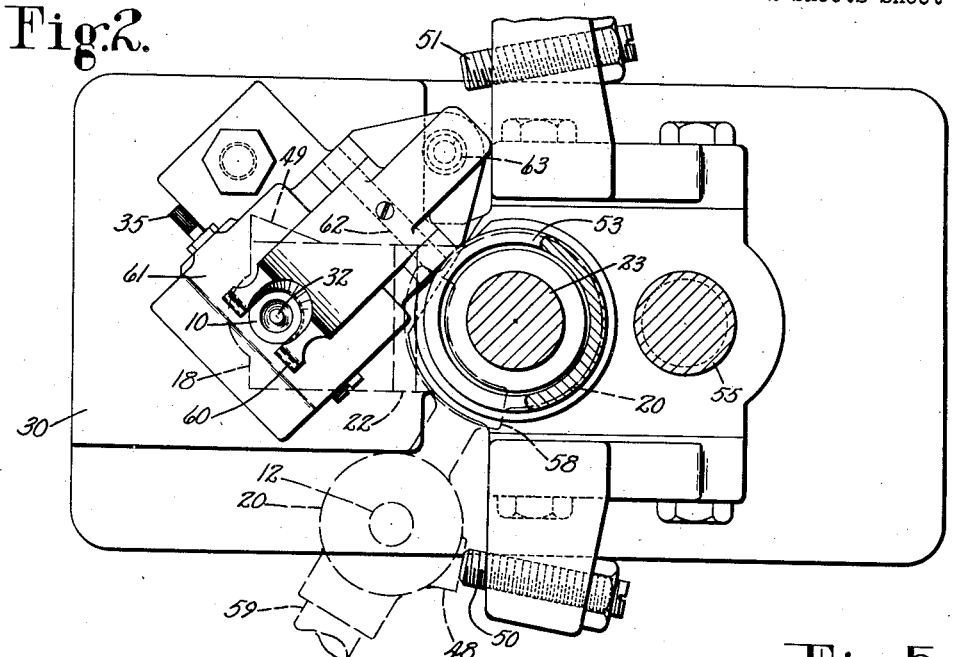

Patented Mar. 14, 1944

2,343,982

UNITED STATES PATENT OFFICE 2,343,982

APPARATUS FOR SETTING PLASTIC EYELETS

Cutler D. Knowlton, Rockport, Mass., assignor to United Shoe Machinery Corporation, Flemington, N. J., a corporation of New Jersey Application December 8, 1941, Serial No. 422,136

5 Claims. (Cl. 218—14)

This invention relates to setting thermoplastic eyelets, and includes both an improved method and improved apparatus for utilizing the method to upset and clench such eyelets. The method is the subject matter of a divisional application Serial No. 484,995, filed April 29, 1943.

Both the method and the apparatus herein illustrated are predicated upon the use of previously molded eyelets of thermoplastic material each having a tubular barrel and a flange or head at one end thereof, but no corresponding flange at the opposite end. The method herein set forth produces a flange at the opposite end after the latter has been thrust through the eyelet-receiving material.

As the term "thermoplastic" implies, the material so characterized may be reduced to a plastic or semi-plastic state by heat and its shape changed while in that state. For the purpose of the present invention the eyelets are made of thermoplastic material capable of being softened in about one second by heat at a temperature nearly, if not quite, 300° F. One of the problems involved in the use of heat is to soften the entering end of an eyelet barrel without softening the previously molded flange at the other end of the barrel and without rendering the entire barrel so soft that it will be collapsed by the upsetting pressure. It has heretofore been proposed to upset and clench thermoplastic eyelets with heated tools, but the use of such tools both to soften an eyelet and to upset and clench it has the disadvantage of leaving the eyelet in its softest condition after it has been clenched.

In contrast with that technique, the present invention provides a novel method in which the step of heating the entering end of the eyelet is terminated before the upsetting step begins, and in which the upsetting and the cooling of the eyelet are contemporaneous. Consequently, when the clenching is completed, the heat of the eyelet is so greatly dissipated as to establish a permanent rigidity of the eyelet before the setting pressure is removed therefrom.

The improved apparatus hereinafter described for utilizing this novel method provides a heated tool for heating the entering end of an eyelet barrel, and another tool, not heated, for clenching the eyelet and restoring its rigidity, the two tools being so related and carried by a turret as to be capable of being brought successively to a common operating locality within an interval of time consistent with thermal requirements.

Referring to the drawings,

Fig. 2 is a plan view, partly in section, of the work-supporting bed of the machine;

Fig. 3 is a perspective view of a typical portion of a shoe upper into which thermoplastic eyelets have been inserted in readiness for clenching according to the method hereinafter described;

Fig. 4 is a vertical section, on a magnified scale, including an article of work and the tool assemblage comprising the heating tool;

Fig. 5 is a longitudinal section of a thermoplastic eyelet shaded to represent the differential of temperature produced therein by this method; and Fig. 6 is a vertical section of the tool assemblage including the clenching tool and a specimen of work comprising an eyelet in the final stage of being clenched.

Figure 1:
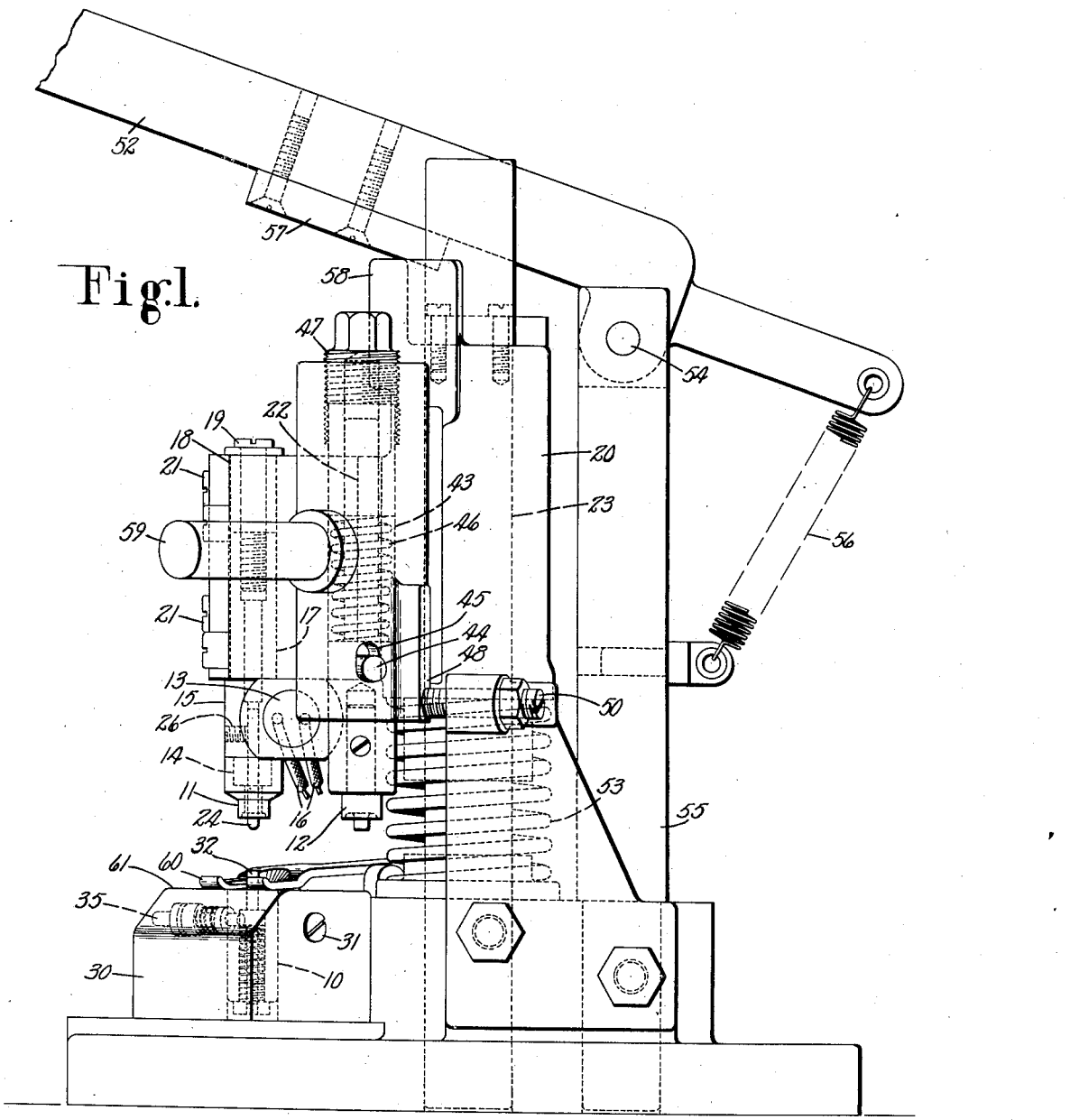
Fig. 1 is a side elevation of a machine embodying the principles of the present invention.

The organization represented in Fig. 1 comprises an anvil or eyelet-supporting tool 10, a heating tool 11 and an eyelet-setting tool 12. The tools 10 and 12 are not to be heated and will remain at room temperature but the tool 11 is maintained at a temperature of about 300° F. by an electric heating unit 13. The tool 11 engages and is affixed to a boss 14 formed on a block 15 of heat-conducting metal such as copper or bronze, in which the electric unit 13 is embedded. Wires 16 extend from the unit 13 to connect the resistance element thereof with a source of electric current.

A shank 17 formed on the block 15 projects into a socket in a steel block 18 and is affixed thereto by a screw 19. The block 18 is affixed to a vertically movable carrier 20 by screws 21 but is thermally insulated therefrom by an interposed block 22 of low thermal conductivity. The carrier 20 has a vertical bore through which a cylindrical post 23 extends, and the carrier is capable not only of sliding up and down on the post but also of being oscillated about the axis of the post, the purpose of its oscillating movement being to shift the tools 11 and 12 alternately into alignment with the anvil or eyelet-supporting tool 10.

Referring to Fig. 4 the work-engaging portion of the heated tool 11 is in the form of a cylindrical sleeve the internal diameter of which is but little greater than the external diameter of the entering end of an eyelet. A pin 24 in the center of the tool 11 projects a short distance below the tool and is rounded or tapered to enter the barrel of an eyelet without upsetting the latter, but is of a size to engage the internal surface of the entering end of the eyelet. Consequently, the tool 11 and the pin 24 form a cylindrical annular space 25 of a size that will receive the entering end of an eyelet without changing its shape, and the rounded or tapered extremity of the pin will center the eyelet before the latter enters the space 25. The projecting portion of the pin is therefore effective to correct any slight misalignment of the eyelet when the tool 11 descends. The pin 24 extends into a bore in the heated block 15 and is fastened therein by a set-screw 26. Consequently, the temperature of the pin 24 will be as high as that of the tool 11 and will soften the entering end of an eyelet by contact with the internal surface of the barrel while the tool 11 engages and heats the external surface of the barrel. Moreover, a narrow, circular bead 27 is formed on the lower end of the tool 11 to impress a groove in the upper surface of the eyelet-receiving material. The purpose of this groove is to receive the rim of the revolute flange into which the entering end of the eyelet is to be transformed by the upsetting tool 12 and thus provide for an interlocking relation of the eyelet and the layer of eyelet-receiving material so grooved.

The anvil or eyelet-supporting tool 10 is nested in a socket bored in the base 30 and is secured therein by a set-screw 31. This tool is provided with a central bore for a centering pin 32 of a size that will enter the flange end of an eyelet. The upper end of the tool is provided with an annular groove of dished section surrounding the centering pin 32 to provide a seat for engaging the flange of an eyelet. The pin 32 is normally projected a short distance above the upper end of the tool 10 by a light compression spring 34 but may be depressed by the pin 24 when the latter is depressed to its operative position. When the pin 32 is thus depressed it is caught by a locking pin 35 as shown in Figs. 4 and 6. For this purpose the pin 32 is provided with a flange or collar 36 which sustains the thrust of the spring 34 to raise the centering pin to its initial position. The locking pin 35 is also provided with a collar 37 against which a compression spring 38 acts to shift the pin to its locking position. The locking pin projects a short distance from its bearing in the base 30 to be grasped and retracted by the operator after each eyelet has been upset and clenched.

Referring to Fig. 6 the upsetting tool 12 is provided with an annular upsetting surface 40 of concave section adapted to transform the entering end of an eyelet into a revolute flange and to embed the rim of that flange in the groove formed in the eyelet-receiving material by the bead 27 of the heated tool 11. The tool 12 is also provided with a central pilot 41 of a size that will enter the barrel of an eyelet to brace the barrel against being collapsed by the upsetting pressure.

The tool 12 is affixed to a plunger 42 and the latter is arranged to slide within close limits in a bore 43 formed in a portion of the vertically movable carrier 20. A pin 44 (Fig. 1) affixed to the plunger 42 projects radially therefrom and occupies a slot 45 formed in the carrier. A compression spring 46 located in the bore 43 normally depresses the plunger 42 to maintain the pin 44 at the lower end of the slot 45, but when the carrier 20 is depressed to operate the tool 12 the spring 46 will yield to prevent applying excessive upsetting pressure to this tool. The upper end of the spring 46 is seated against a plug 47 screwed into the carrier 20 above the bore 43.

The screw connection between the plug 47 and the carrier 20 provides for adjusting the plug to regulate the applied force of the spring.

The heated tool 11 and the non-heated tool 12 are arranged side by side and their axes and the axis of the eyelet-supporting tool 10 are equally distant from the axis of the post 23. Consequently, the tools 11 and 12 may be shifted alternately into register with the eyelet-supporting tool 10 as a result of oscillating the carrier 20 about the post 23. For indexing purposes the carrier 20 is provided with a boss 48 (Fig. 2) arranged to arrest the carrier when the heated tool 11 is in alignment with the eyelet-supporting tool 10 and with a boss 49 arranged to arrest the carrier when the non-heated upsetting tool 12 is in alignment with the tool 10. These bosses cooperate respectively, with adjustable stops 50 and 51.

A hand-lever 52 is provided for depressing the carrier 20 in opposition to the force of a compression spring 53 that surrounds the post 23 and normally raises the carrier. A fulcrum pin 54 connects the lever 52 and an anchoring post 55 affixed to the base 30. A tension spring 56 connected to the lever 52 relieves the compression spring 53 of the load due to the weight of the lever. A hardened steel block 57 affixed to the lever 52 is arranged to operate against a portion 58 of the carrier 20 to depress the latter, the portion 58 having sufficient width to maintain contact with the block 57 throughout the range of oscillation of the carrier from side to side. The carrier is provided with a handle 59 by which it may be oscillated about the post 23. This handle is so located as to be grasped by the operator's right hand while the operating lever 52 is grasped in the left hand.

The base 30 is provided with a presser-foot 60 arranged to clamp the eyelet-receiving material of a work-piece against a horizontal supporting surface 61 of the base. The presser-foot is mounted on a fulcrum pin 62 and its forward end is normally depressed by a compression spring 63 (Fig. 2) that raises its rear end. The rear end of the presser-foot may be depressed manually to raise the forward end when a work piece is to be placed on the tool 10 or removed therefrom.

Fig. 3 represents a typical specimen of the left-hand quarter of a shoe upper into which plastic eyelets have been inserted in readiness to be upset and clenched as hereinafter set forth. In this view the lining 65 of the quarter is uppermost and the outer leather 66 is below it. A stay strip 67 of woven fabric or other suitable reinforcing material is interposed between the lining and the outer leather to reinforce the eyelet row.

The procedure for eyeleting such a work-piece in accordance with this invention is as follows: a suitable punch or punching machine is used first to punch a series of eyelet-receiving holes in the eyelet row, the diameter of the holes being preferably slightly smaller than the outer diameter of the barrels of the eyelets to be inserted. The eyelets may be inserted in these holes manually or by an automatic machine without being clenched and the barrels will be retained in the holes by friction. Preferably the flanges 68 of the eyelets will be seated on the outer surface of the outer leather 66 and the entering ends 69 will project beyond the lining far enough to provide the necessary length to be transformed into revolute clenching flanges.

A quarter thus provided with unclenched eyelets will be inserted under the presser-foot 60 in a position that will locate the flange 68 of one of the eyelets in the grooved seat formed in the anvil or eyelet-supporting tool 10. If the centering pin 32 in this tool is locked at this time in its depressed position by the locking pin 35 the operator will retract the latter. The centering pin 32 will now occupy the barrel of the eyelet to maintain it positively in the desired location. With one hand the operator will now swing the carrier 20 to the right to the position determined by the boss 48 and the stop 50 (Fig. 2) thereby placing the heated tool 11 in alignment with the eyelet-supporting tool 10. Now, with the left hand, the operator will depress the operating lever 52 to move the heated tool 11 into engagement with the located eyelet and the eyelet-receiving material as represented in Fig. 4. The bead 27 formed on the tool 11 will impress an annular groove in the lining 65 adjacent to the barrel of the eyelet and at the same time the tool 11 and the pin 24 therein will heat the entering end of the eyelet sufficiently to render it soft and capable of being transformed.

In Fig. 5 the zone between the lines A—A and B—B indicates the portion of an eyelet that will be rendered soft by heat in about one second of time. The portion of the eyelet below the line B—B will not be heated to a degree that will render it soft because this portion is not engaged by the heated tool 11 but is engaged by the non-heated pin 32 and the non-heated tool 10.

Having held the heated tool 11 about one second in the position represented in Fig. 4 the operator will raise the operating lever 52, swing the carrier 20 to the left until the boss 49 is arrested by the stop 51 (Fig. 2) and will immediately depress the operating lever again, this time to depress the non-heated upsetting tool 12 against the entering end of the eyelet which is still soft enough to be transformed. Now, while the tool 12 is developing a revolute clenching flange in the softened portion of the eyelet it will embed the rim of this flange in the groove produced by the bead 27 and simultaneously reduce the temperature of the clenched portion and restore it to a hard condition. Moreover, while the tool 12 is transforming the entering end of the eyelet its central pilot 41, now nested in the barrel of the eyelet, will brace the latter against the tendency to be collapsed by the transforming pressure and the true shape and diameter of the intermediate portion of the barrel will thus be preserved. An interval of about one second of contact of the tool 12 with the eyelet is sufficient to perform the transforming operation and to restore the transformed portion to a hard or rigid state. Now, the operating lever 52 may be raised, the presser-foot 60 may also be raised, the work may be shifted to place another eyelet on the tool 10, the presser-foot may be released, and the locking pin 35 may be retracted to permit the centering pin 32 to enter the eyelet next to be operated upon.

Having thus described my invention, what I claim as new and desire to secure by Letters Patent of the United States is:

1. A machine for setting thermoplastic eyelets comprising a non-heated eyelet-supporting tool provided with a seat for engaging the flanged end of an eyelet, a heated tool formed and arranged to move into and out of telescopic relation with the entering end of an eyelet seated on said supporting tool, an upsetting tool thermally insulated from said heated tool, means by which said heated tool and said upsetting tool may be shifted alternately to and from alinement with said supporting tool, and means for operating said heated tool and said upsetting tool each in its alined relation with said supporting tool.

2. An eyeleting machine as set forth in claim 1 in which said heated tool is provided with a central eyelet-engaging portion and with a surrounding portion spaced therefrom to form an intermediate cavity to receive the entering end of an eyelet without upsetting it.

3. An eyeleting machine as set forth in claim 1 in which said heated tool is provided with a portion formed to surround and engage the entering end of the eyelet without upsetting it and with a bead formed to impress a groove in the eyelet-receiving material for receiving the rim into which the entering end of the eyelet is to be transformed by said upsetting tool.

4. An eyeleting machine as set forth in claim 1 in which said heated tool and said upsetting tool are arranged in a common carrier movable sidewise to shift them one into and the other out of alinement with said eyelet-supporting tool and movable otherwise to impart operating movement to said tools.

5. A machine for setting thermoplastic eyelets comprising a non-heated eyelet-supporting tool provided with a seat for engaging a flange at one end of an eyelet, a heated tool having a bead formed to surround the entering end of an eyelet and impress a groove in the eyelet-receiving material adjacent to said entering end, a non-heated upsetting tool thermally insulated from said heated tool and having an operating surface formed to upset the entering end of the eyelet and embed the rim thereof in the groove formed by said bead, means for shifting said heated tool and said upsetting tool alternately to and from alinement with said eyelet-supporting tool, and means for operating said heated tool and said upsetting tool.

CUTLER D. KNOWLTON.